US 11,198,325 B2

(12) United States Patent
Paoli et al.

(10) Patent No.: US 11,198,325 B2
(45) Date of Patent: Dec. 14, 2021

(54) IMPACT TOOL

(71) Applicant: DINO PAOLI S.R.L., Reggio Emilia (IT)

(72) Inventors: Patrizia Paoli, Cadelbosco di Sopra (IT); Federico Galloni, Reggio Emilia (IT); Emanuele Borsetto, Trebaseleghe (IT)

(73) Assignee: Dino Paoli S.r.l.

( * ) Notice: Subject to any disclaimer, the term of this patent is extended or adjusted under 35 U.S.C. 154(b) by 76 days.

(21) Appl. No.: 16/246,657

(22) Filed: Jan. 14, 2019

(65) Prior Publication Data
US 2020/0223256 A1   Jul. 16, 2020

(51) Int. Cl.
*B25B 23/147*   (2006.01)
*B60B 29/00*   (2006.01)
(Continued)

(52) U.S. Cl.
CPC ........ *B60B 29/006* (2013.01); *B25B 23/1453* (2013.01); *B25D 9/06* (2013.01);
(Continued)

(58) Field of Classification Search
CPC ................ B25D 9/06; B25D 2250/051; B25D 2250/141; B25B 23/1453; B23B 23/147
(Continued)

(56) References Cited

U.S. PATENT DOCUMENTS 4,319,134 A * 3/1982 Weber ..................... G01P 3/486
                                                    250/231.16
4,328,871 A * 5/1982 Gluskin ................ B25B 23/141
                                                    173/178
(Continued)

FOREIGN PATENT DOCUMENTS

EP       1595650 A2    11/2005
EP       2535139 B1    4/2016
WO    2004029569 A1    4/2004

*Primary Examiner* — Gloria R Weeks
(74) *Attorney, Agent, or Firm* — Laubscher & Laubscher, P.C.

(57) ABSTRACT

An impact tool comprises:
- a casing;
- a rotating hammer arranged in the casing and rotatable by a motor;
- a rotating interface element arranged in the casing and rotatable by the hammer by a series of impacts;
- an output shaft rotating around a rotation axis, the output shaft having a proximal end fixed to the interface element and a distal end protruding from the casing, the distal end ending with a connecting element for removable connection to an outer mechanical adaptor;
- a unit of measurement arranged for obtaining torque of the output shaft by a torque sensor mounted to the output shaft, the unit of measurement comprising a fixed measuring assembly mounted integrally to the casing and a rotating measuring assembly mounted so as to rotate integrally with the rotating output shaft;
- the fixed measuring assembly being configured to generate a supply signal and transmit the supply signal to the rotating measuring assembly to supply electrically the rotating measuring assembly;
- the rotating measuring assembly being configured to detect a measuring signal indicating the torque and condition the measuring signal in order to be able to send the measuring signal to the fixed measuring assembly;

(Continued)

in which the fixed measuring assembly and the rotating measuring assembly comprise electronic devices that execute a two-directional communication in contactless mode by magnetic coupling between the fixed measuring assembly and the rotating measuring assembly, the communication being configured to supply magnetically the torque sensor and permit transmission of the measuring signal conditioned by the rotating measuring assembly to the fixed measuring assembly.

16 Claims, 8 Drawing Sheets

(51) Int. Cl.
  *B25B 23/145* (2006.01)
  *B25D 9/06* (2006.01)
(52) U.S. Cl.
  CPC .. *B25D 2250/045* (2013.01); *B25D 2250/051* (2013.01); *B25D 2250/141* (2013.01); *B25D 2250/181* (2013.01); *B25D 2250/205* (2013.01); *B25D 2250/221* (2013.01)
(58) Field of Classification Search
  USPC .................................................. 173/181, 182
  See application file for complete search history.

(56) References Cited

U.S. PATENT DOCUMENTS

| | | | |
|---|---|---|---|
| 5,366,026 A * | 11/1994 | Maruyama | B23P 19/066 173/180 |
| 6,581,696 B2 * | 6/2003 | Giardino | B25B 23/1405 173/1 |
| 9,236,829 B2 * | 1/2016 | Sugie | H02P 7/29 |
| 9,701,000 B2 * | 7/2017 | Sekino | B25B 21/007 |
| 2004/0182587 A1 | 9/2004 | May et al. | |
| 2007/0103104 A1 | 5/2007 | May | |
| 2010/0301846 A1 * | 12/2010 | Lee | G01P 3/487 324/207.25 |
| 2014/0034347 A1 * | 2/2014 | Lam | B25F 5/00 173/180 |
| 2014/0113828 A1 * | 4/2014 | Gilbert | H01L 39/225 505/100 |
| 2014/0182869 A1 * | 7/2014 | Kumagai | B25F 5/02 173/93 |
| 2015/0021062 A1 * | 1/2015 | Sekino | B25B 23/1453 173/183 |
| 2015/0336249 A1 * | 11/2015 | Iwata | B25B 21/02 173/1 |
| 2016/0325414 A1 * | 11/2016 | Mizuno | B25B 23/1475 |
| 2017/0157752 A1 * | 6/2017 | Nishimiya | B25F 5/001 |
| 2018/0169847 A1 * | 6/2018 | Lorenz | B25D 16/003 |
| 2019/0232471 A1 | 8/2019 | Paoli | |
| 2019/0275652 A1 * | 9/2019 | Welch | B25B 31/00 |

* cited by examiner

IMPACT TOOL

BACKGROUND OF THE INVENTION

The invention relates to an impact tool, in particular an impact wrench.

The present invention can be used for locking and unlocking a bolt on a threaded hub of a wheel or a nut on a threaded pin provided in a wheel, for example for rapidly changing the wheels of a vehicle during a race.

The invention relates to an impact tool in which: a rotating mass, for example a hammer, which acts as a flywheel for storing mechanical energy, is rotated by a motor, in particular of pneumatic type; a rotating shaft is fixed to an anvil rotated by the hammer by a series of impacts, for example one impact for each rotation revolution; the connecting mechanism between the hammer and the anvil comprises a clutch that, after each impact, leaves the hammer free again to rotate and which can be driven, for example, by a cam system. In use, a bush is connected removably to the rotating shaft.

The invention relates to an impact tool having a torque sensor operationally associated with the output shaft.

The use of a pneumatic impact wrench for fitting and removing wheels to and from a vehicle is known, in which the tightness of the bolt that locks the wheel on the hub must be safe and reliable, also when the stress transmitted by the wheels to the hub is high, as occurs in a vehicle competing in a car or motor cycle race.

It is thus necessary not only that the impact wrench rotates fast but also ensures appropriate tightness, with a known torque, so as not to damage the bolt, to ensure the maintenance of the coupling between bolt and hub in any condition, for example during a race.

In addition, it is desirable to monitor the tightness of each bolt of a wheel and obtain the number of appropriate tightening operations performed.

For example, from patent publication EP2535139 B1, measuring the torsional moment on the output shaft of a known pneumatic impact tool is known, by using a torque sensor of magnetic type, and stopping the tool when a threshold value of the detected torque is reached. The torque sensor comprises at least two coils wound around the output shaft of the tool, in which one coil (generator coil) operates as a magnetic field generator and the other coil (sensor coil) operates as a magnetic field sensor. The generator coil is connected to a first electronic module that comprises a driver and a signal generator. The sensor coil is connected to a second electronic module to condition the analog signal supplied by the sensor coil and to process the analog signal so as to supply an output signal. The torque sensor is provided with a supply of electric energy, for example a battery.

One drawback of known pneumatic impact tools of the prior art is that the measuring signal is affected by significant errors. In fact, the magnetic torque sensor like the one disclosed above, is extremely sensitive to temperature, which in the operational conditions of applying the aforesaid pneumatic tools can vary significantly. The presence of errors in the measuring signal is particularly significant inasmuch as the measuring signal detected in the pneumatic impact tools is a weak signal.

Another drawback of the pneumatic impact tools known from the prior art is that the magnetic torque sensor has a short working life because of the mechanical and thermal stress due to the operating conditions of application of the aforesaid pneumatic tools.

SUMMARY OF THE INVENTION

One object of the invention is to improve impact tools of known type.

Another object of the invention is to provide an impact tool in which the measuring signal is not substantially affected by measuring errors due to the vibrations, rotation speed of the rotating shaft and to the operating temperatures that are necessary during operation of the impact tool.

A further object of the invention is to provide an impact tool that has a long working life and, in particular, is not substantially affected by oxidation by atmospheric agents.

Still another further object of the invention is to provide an impact tool of simple, cheap construction and of great reliability.

The aforementioned objects and still others are achieved with an impact tool according to one or more of the claims set out below.

Owing to a unit of measurement in which both a supply signal and a measuring signal of the torsional moment, or data associated therewith, are transferred by magnetic coupling, in particular resonant, between two coils, the impact tool according to the invention is able to measure with precision and reliability the tightening torque, in order to determine if and when all the screw-locking members have been screwed to the desired tightening force.

Further, this unit of measurement enables a measuring signal to be obtained that is substantially free of measuring errors because an acquisition system for acquiring the measuring signal, associated with the impact tool according to the invention to acquire the measuring signal in order to permit reading thereof, is not substantially altered by the operating conditions of the impact tool that require great and complex dynamic stress. Also, the unit of measurement is tough and has a long working life because of the fact that the two coils and the acquisition system are substantially protected from oxidation by atmospheric agents.

Further, the unit of measurement is extremely cheap, inasmuch as it can use low clock frequency and therefore non-costly microprocessors. This is permitted by a simple method for acquiring and distributing the measuring signal that extracts data relating to the tightening torque, increasing in a set zone of the unit of measurement energy consumption indicating the tightening torque according to a preset logic.

The unit of measurement of the torsional moment of the impact tool according to the invention is shaped so as to be suitable for use in situations of significant criticality, such as for example in the context of an impact tool that works with great and complex dynamic stress.

BRIEF DESCRIPTION OF THE DRAWINGS

The invention can be better understood and implemented with reference to the attached drawings that illustrate an embodiment thereof by way of non-limiting example, in which.

DETAILED DESCRIPTION

With reference to the aforesaid Figures, overall with 1 an impact tool has been indicated that, in the specific case, is an impact wrench usable, for example, for fitting and removing wheels of vehicles, in particular racing cars or motorcycles.

Figure 1:
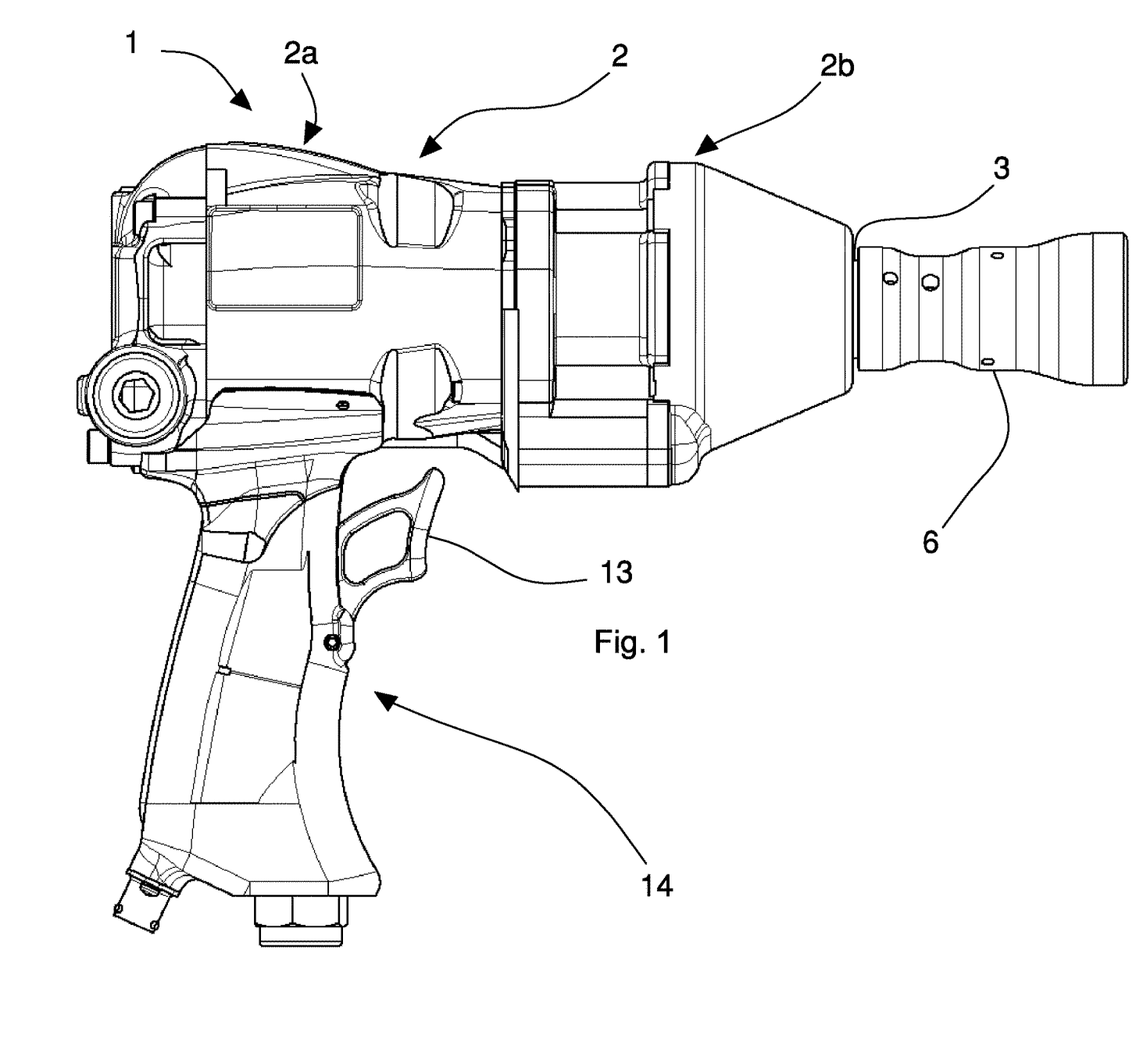
FIG. 1 is a side view of an impact tool according to the present invention.

With reference in particular to FIG. 1, the impact tool 1 comprises a containing and protection casing 2 provided with a first part 2a arranged for housing internally a rotating hammer (not shown in the Figures) rotated by a motor (also not shown in the Figures). In the specific case, the motor is of pneumatic type. The rotating hammer acts as a flywheel for accumulating mechanical energy.

In the first part 2a a grip 14 is obtained for gripping of the impact tool 1 by an operator to facilitate the operations of fitting or removing one or more wheel of vehicles.

Figure 2:
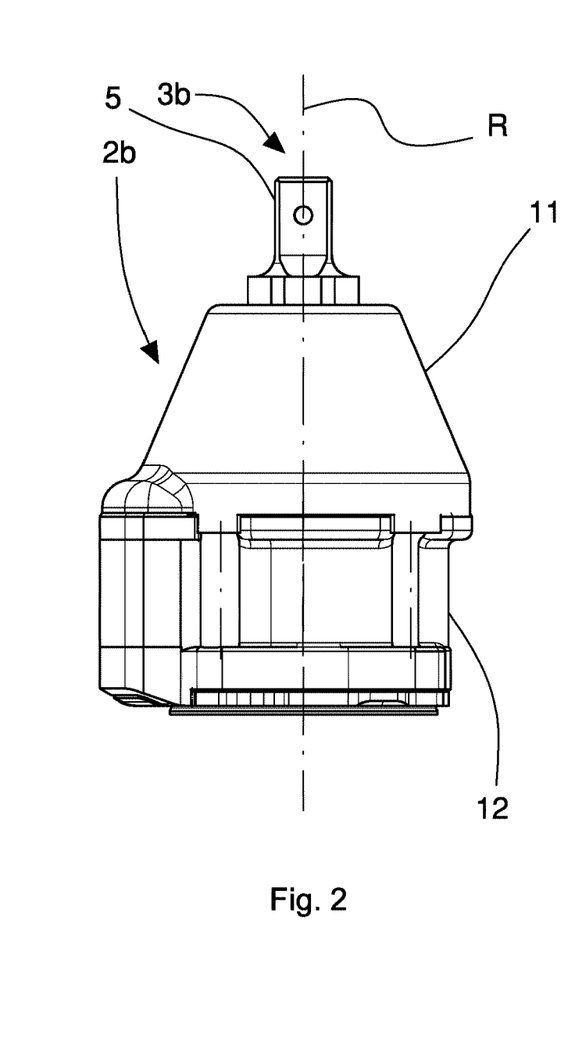
FIG. 2 is a view from the right of a unit of measurement provided in the impact tool of FIG. 1.

The impact tool 1 comprises, further, an output shaft 3 rotatable around a rotation axis R (FIG. 2). The output shaft 3 can have, as in the specific case, a proximal end 3a arranged near a rotating interface element 4 (visible, in particular, in FIGS. 9 to 18) and a distal end 3b that can, as in this case, protrude beyond the casing 2.

The interface element 4, in use, is rotated by the rotating hammer by a series of impacts. The output shaft 3 is integral in rotation with the interface element 4.

The distal end 3b can terminate with a connecting element 5, shown in FIGS. 2 to 18, for removable connection with an external device. The connecting element 5 can comprise, for example as in the specific case, a square fitting. The external device can comprise, for example, a bush or mechanical adapter 6, suitable for connecting the connecting element 5 to a screw member, not shown in the Figures (for example with a nut for locking a wheel on a hub).

The rotating hammer and the interface element 4 are coupled by a coupling system of known type, which can comprise a front clutch 10 driven by a cam system that connects and disconnects periodically (for example once a revolution) the rotating hammer and the interface element 4 to and from one another. The rotating hammer and the interface element 4 can be so coupled that at each rotation revolution the rotating hammer couples for a short period of time (for a fraction of a revolution) with the interface element 4 giving the interface element 4 a rotation pulse with a high torque impact.

In use, when the operator activates the impact tool 1, for example by pressing a start button 13 obtained in the first part 2a of the casing 2, a supply of compressed air drives the pneumatic motor that commands the rotating hammer that, by hitting the rotating interface element 4 repeatedly, rotates the output shaft 3 applied to the external device (screw coupling member). In the case of a wrench, a screw coupling member will be screwed (or unscrewed) by the intermittent action of a succession of torsional impacts. During a wheel fitting, in the initial impacts, the rotations of the output shaft 3 will be, for each impact, relatively high, and then decrease as the final situation approaches in which the external device (for example the screw coupling member) has been rotated (screwed) at the desired tightness.

Figure 3:
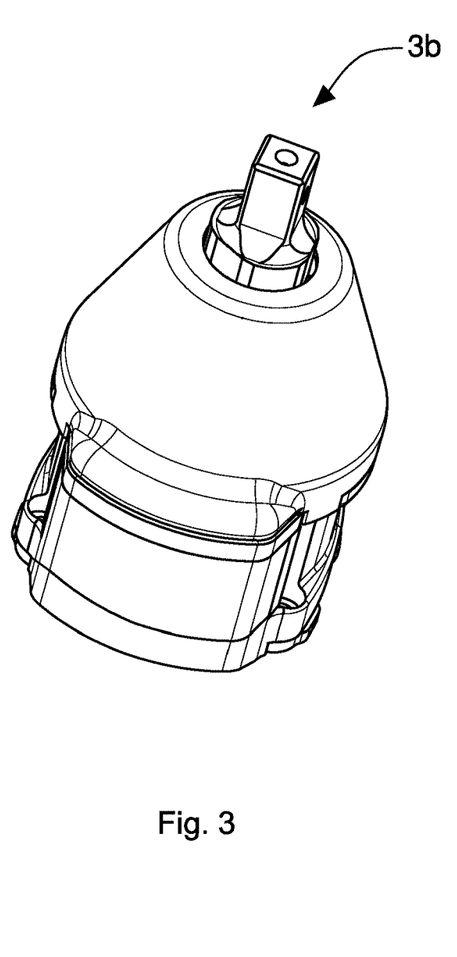
FIG. 3 is a perspective view of the unit of measurement of FIG. 2.
Figure 4:
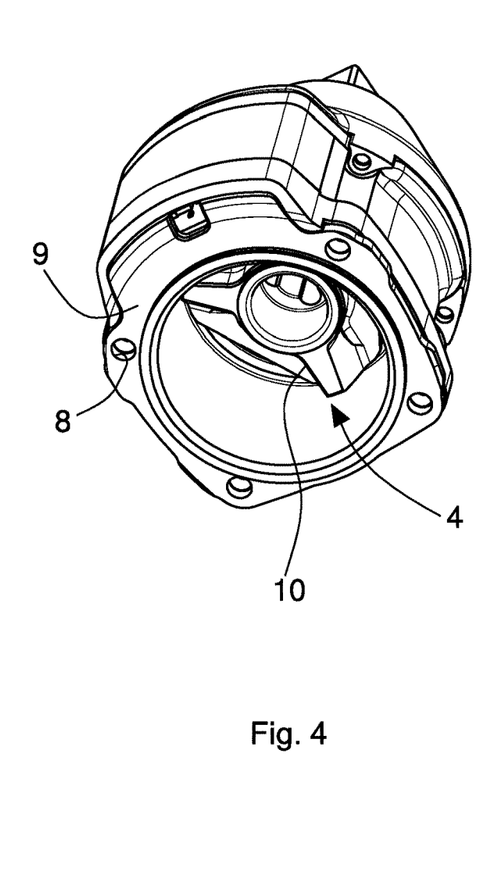
FIG. 4 is a bottom perspective view of the unit of measurement of FIG. 2.

With reference in particular to FIGS. 2 to 4, the casing 2 further comprises a second part 2b arranged for housing internally a unit of measurement of the impact tool 1.

The unit of measurement is associated with the output shaft 3 and is arranged for detecting a measuring signal indicating a torque to which the output shaft 3 is subjected during use, i.e. when the latter is rotated by the interface element-hammer combination for screwing or unscrewing one or more screw-locking members. The unit of measurement is arranged, further, for processing the measuring signal in order to obtain an output signal from an analysis of which it is possible to determine the torque to which the output shaft 3 is subjected during tightening of a bolt or during loosening of a bolt. In particular, the analysis of the output signal enables it to be determined whether the torque to which the output shaft 3 is subjected is greater than a preset threshold value. Still in particular, the analysis of the output signal can enable it to be determined whether the torque to which the output shaft 3 is subjected is greater than the preset threshold value for a set period of time.

The first part 2a and the second part 2b of the casing 2 can be coupled together by a connecting arrangement of known type and not illustrated in the Figures. The connecting arrangement can comprise, for example, a plurality of screws and nuts, each screw being inserted into a corresponding hole 8 provided in a coupling flange 9 of the second part 2b, this coupling flange 9 being arranged for permitting the coupling between the first part 2a and the second part 2b of the casing 2.

The second part 2b of the casing 2 comprises a first casing element 11 that in FIGS. 5 to 18 has been removed to highlight some components of the unit of measurement that are otherwise not visible.

The first casing element 11 has a substantially bell shape that tapers towards the distal end 3b of the rotating output shaft 3.

The second part 2b of the casing 2 comprises, further, a second casing element 12 that is couplable with the first casing element 11. When the first casing element 11 and the second casing element 12 are coupled they make the second part 2b.

The coupling flange 9 is obtained in an end portion of the second casing element 12.

Both the first casing element 11 and the second casing element 12 are hollow to be able to receive internally the unit of measurement and the output shaft 3 with which the unit of measurement is associated.

With reference to FIGS. 5 to 15, the unit of measurement comprises a fixed measuring assembly 20 (shown in particular in FIGS. 5 to 12) and a rotating measuring assembly 21 (shown in particular in FIGS. 13 to 15), that cooperate in use to obtain an output signal indicating torque to which the output shaft 3 is subjected during operation of the impact tool 1.

The fixed measuring assembly 20 and the rotating measuring assembly 21 comprise electronic components that make an acquisition system for acquiring the measuring signal arranged for acquiring the measuring signal in order to permit a reading thereof.

In particular, the rotating measuring assembly 21 is configured to detect the measuring signal and condition it in order to obtain a conditioned signal that carries the information on the torque measurement. The conditioned signal can then be sent to the fixed measuring assembly 20.

The fixed measuring assembly 20 is, on the other hand, configured to generate a supply signal to arrange for supplying electrically the electronic components of the rotating measuring assembly 21 and for processing the conditioned signal received from the rotating measuring assembly 21 in order to obtain the output signal.

The fixed measuring assembly 20 and the rotating measuring assembly 21 are configured so as to be able to communicate reciprocally in contactless mode by a magnetic coupling, in particular a resonant mechanical coupling, as will be clearer further on in the description. In particular, both the electrical supply of the rotating measuring assembly 21 and the transmission of the signal conditioned by the rotating measuring assembly 21 to the fixed measuring assembly 20 occurs by the aforementioned resonant magnetic coupling. The fixed measuring assembly 20 and the rotating measuring assembly 21 comprise electronic devices arranged for making the aforementioned contactless communication by magnetic coupling. The electronic devices will be illustrated with greater detail in the description that follows.

The fixed measuring assembly 20 is mounted integrally to the casing 2. The fixed measuring assembly 20 is fixed (or provided with corresponding motion) relative to the rotating measuring assembly 21 when the output shaft 3 is rotated.

Figure 5:
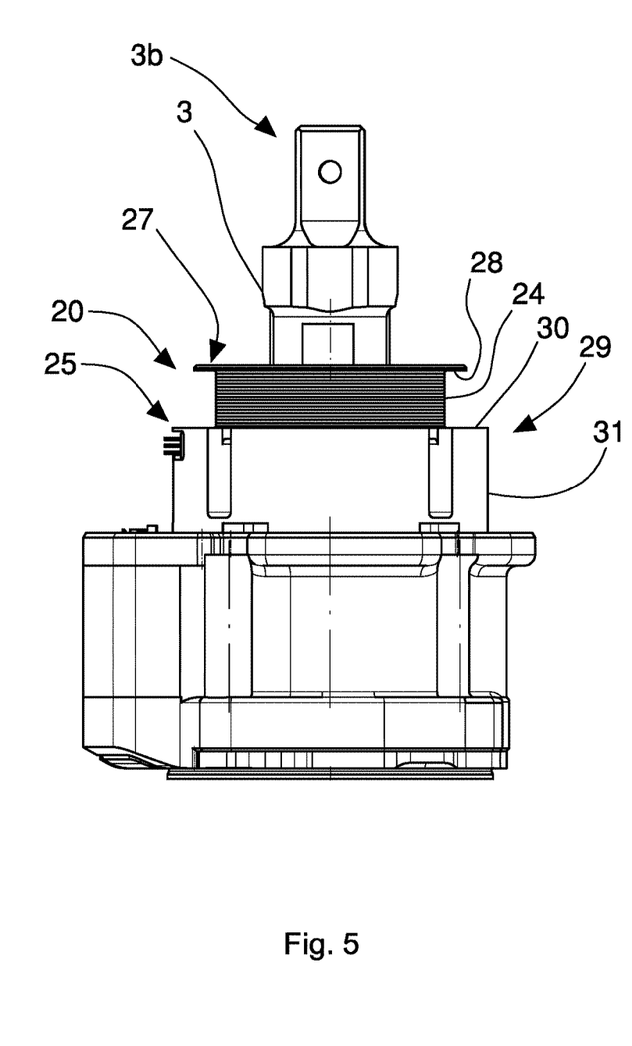
FIG. 5 is a view like that of FIG. 2 in which a part of a casing of the impact tool of FIG. 1 has been removed to show some components of the unit of measurement that are otherwise not visible.
Figure 6:
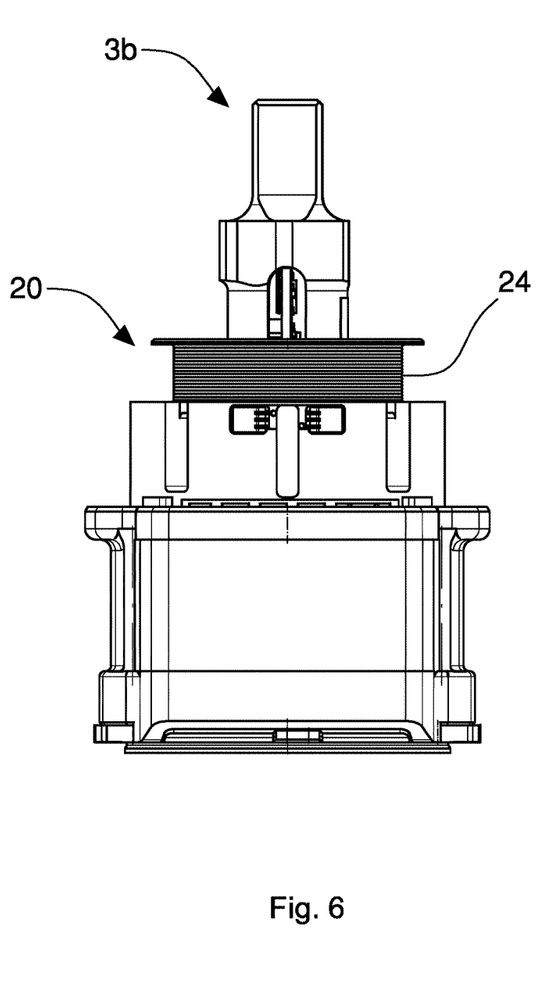
FIG. 6 is a frontal view of the unit of measurement of FIG. 5.
Figure 7:
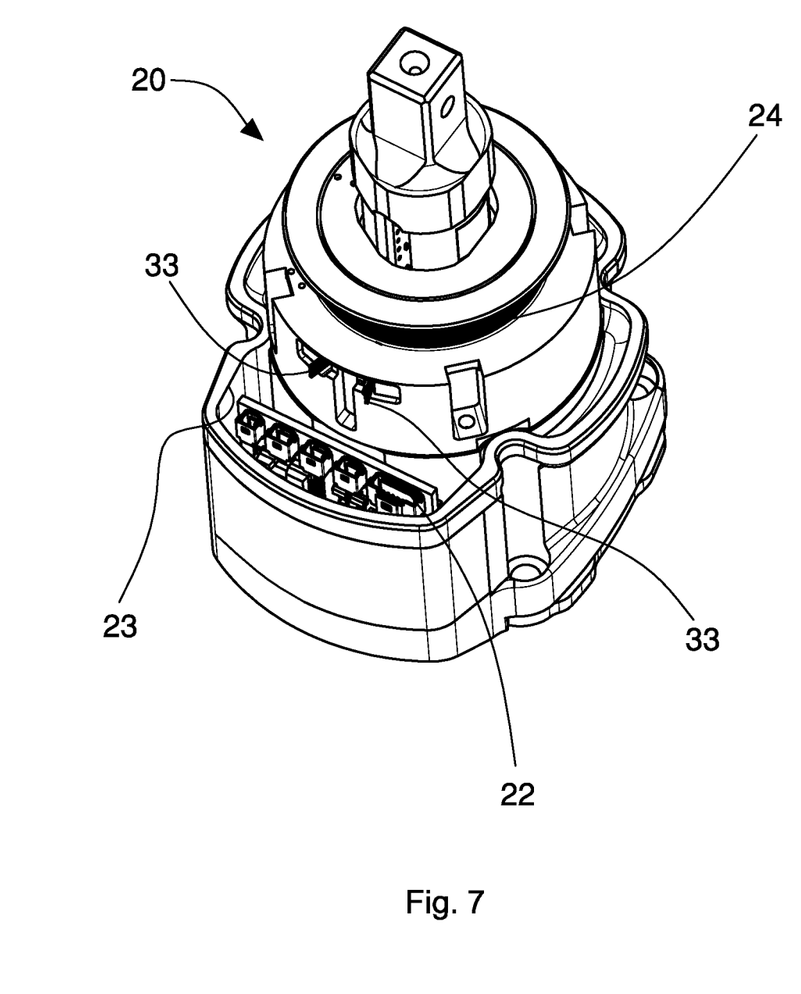
FIG. 7 is a perspective view of the unit of measurement of FIG. 5.
Figure 8:
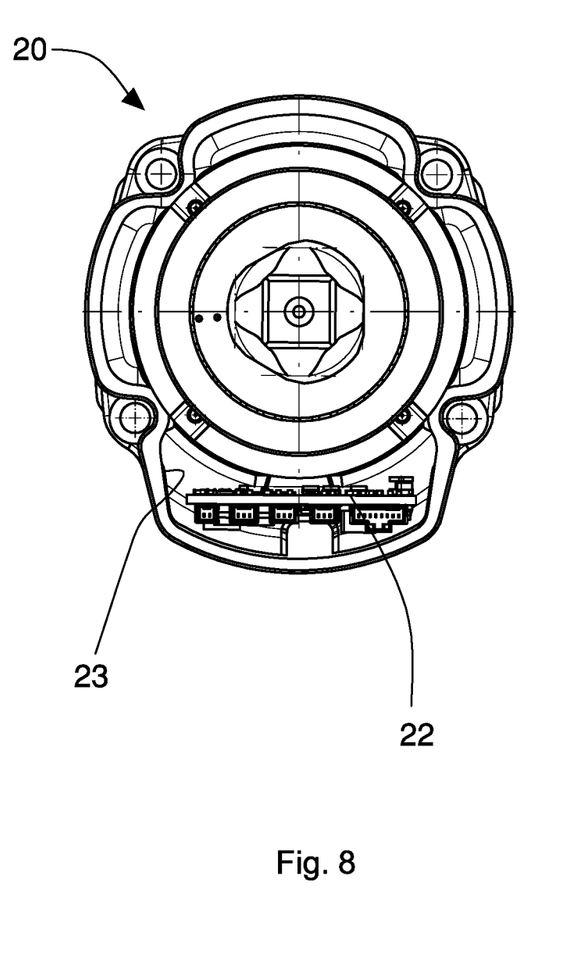
FIG. 8 is a top view of the unit of measurement of FIG. 5.
Figure 9:
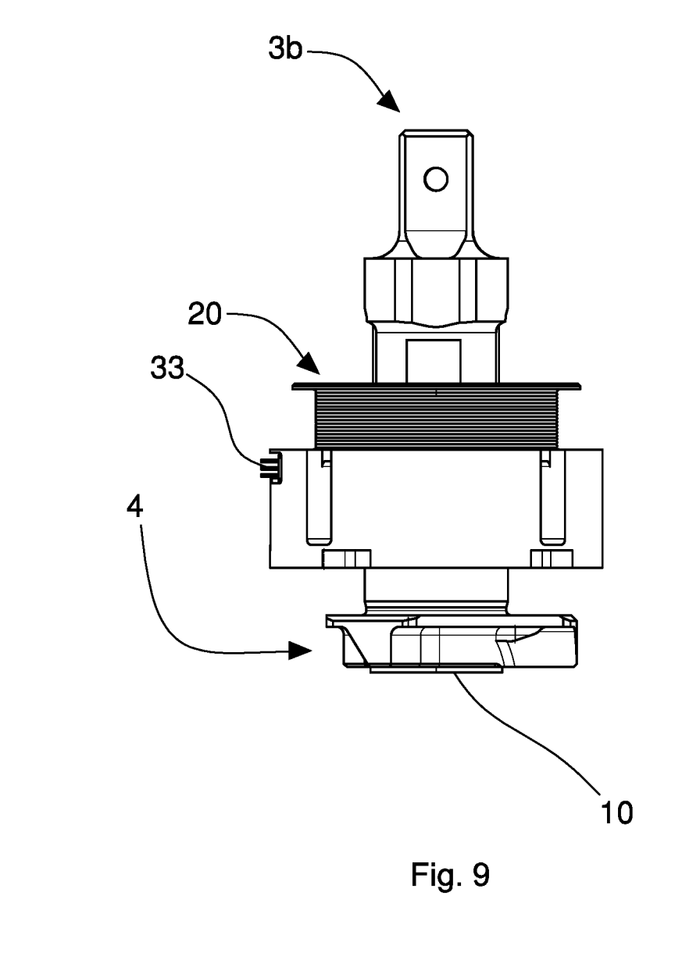
FIG. 9 is a view like that of FIG. 5 in which a further part of the casing of the impact tool of FIG. 1 has been removed to highlight some other components of the unit of measurement that are otherwise not visible.
Figure 10:
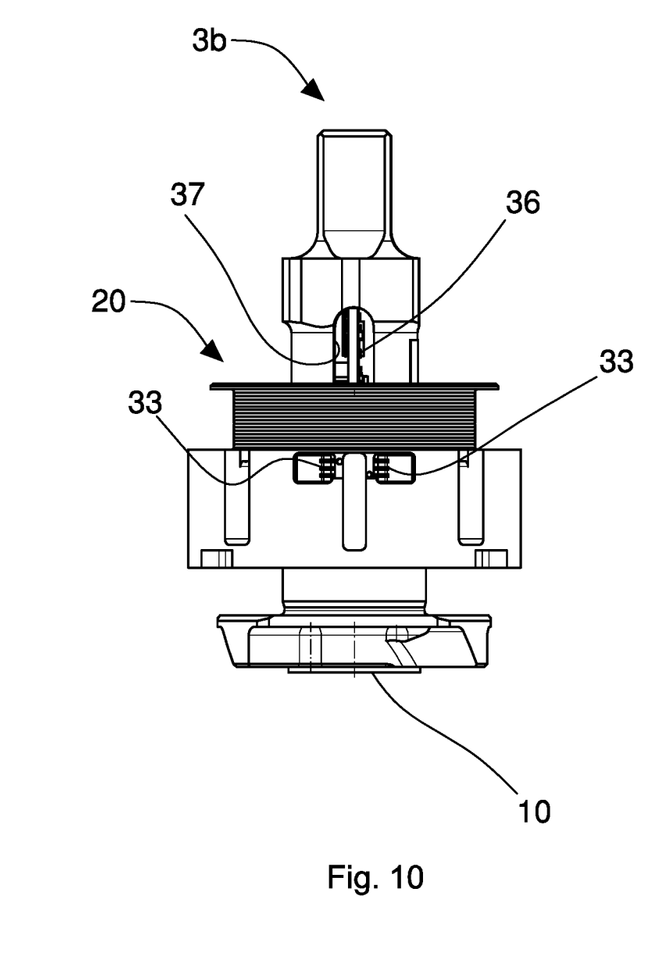
FIG. 10 is a frontal view of the other components of FIG. 9.
Figure 11:
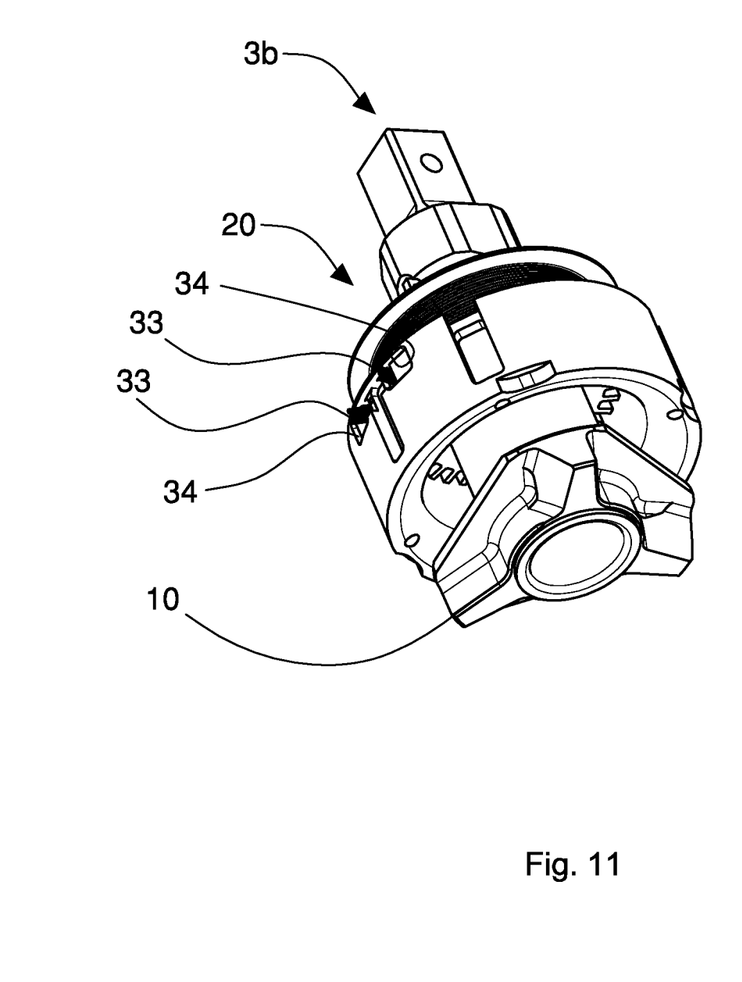
FIG. 11 is a perspective bottom view of the other components of FIG. 9.
Figure 12:
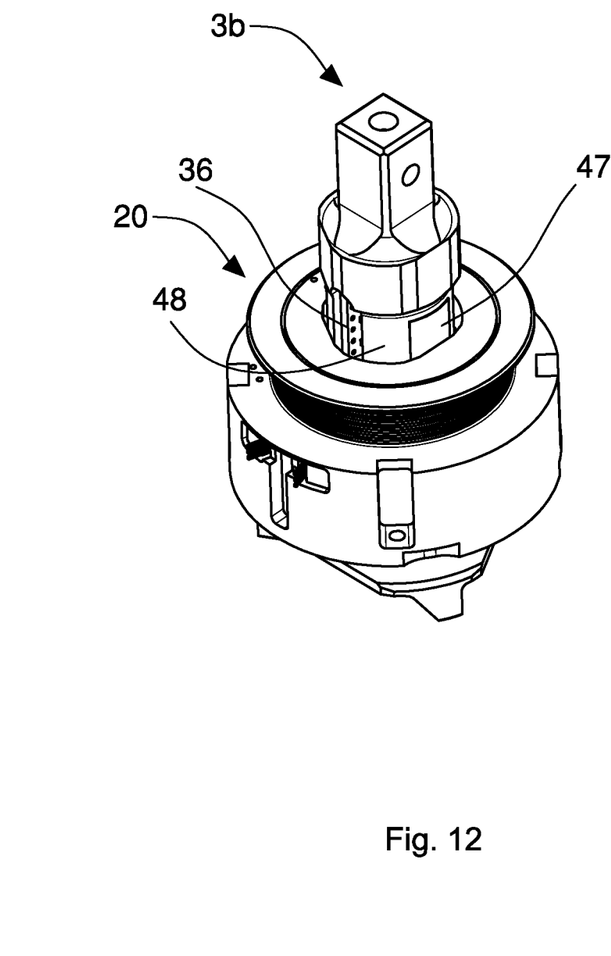
FIG. 12 is a top view of the other components of FIG. 9.

With particular reference to FIGS. 5 to 7, the fixed measuring assembly 20 comprises a fixed electronic module 22 arranged for generating the supply signal.

The fixed electronic module 22 comprises a fixed electronic board to which a microprocessor is mounted that is suitable for generating the aforementioned supply signal. For example, the microprocessor generates an alternating current (or voltage) signal, for example a square wave.

The fixed electronic module 22 is, further, arranged for receiving the signal conditioned by the rotating measuring assembly 21 and processing the conditioned signal.

The fixed electronic module 22 is arranged in a seat 23 obtained in the casing 2, in particular in the second casing element 12 of the second part 2b of the casing 2. The fixed electronic module 22 is, in particular, fixed to the seat 23 so as not to be integral with the output shaft 3, so as not to be rotated when the start button 13 is pressed.

The fixed measuring assembly 20 comprises a first inductive element 24, for example a coil, connected to the fixed electronic module 22 so as to receive the supply signal, in particular an alternating signal, for example a square wave.

The fixed measuring assembly 20 comprises, further, a support element 25 arranged for supporting the first inductive element 24.

The support element 25 is hollow and is arranged for receiving internally the rotating measuring assembly 21 and a portion of the output shaft 3.

The support element 25 is fixed to the second part 2b of the casing 2 so as not to be integral with the output shaft 3, so as not to be rotated when the start button 13 is pressed.

The first inductive element 24 comprises a plurality of windings wound around to the support element 25.

The support element 25 can comprise a tubular portion around a surface of which the windings of the first inductive element 24 are wound in a loop. In the embodiment shown in the Figures, an outer surface of the tubular portion is covered entirely by the windings of the first inductive element 24. In an alternative embodiment, the windings of the first inductive element 24 can cover partially this outer surface.

The support element 25 can comprise, further, a pair of flanges for containing along a direction substantially parallel to the axis R the windings of the first inductive element 24.

The pair of flanges comprises a first flange 27 having a substantially disc shape with a plan shape like a circular crown and mounted near the end of the support element 25 nearer the distal end 3b of the output shaft 3. The first flange 27 comprises a face 28 facing the tubular portion intended to contain longitudinally part of the windings of the first inductive element 24.

The pair of flanges comprises, further, a second flange 29 that comprises an annular wall 30 facing the tubular portion and intended to contain longitudinally a further part of the windings of the first inductive element 24.

The second flange 29 can have a substantially hollow cylinder conformation.

The tubular portion, the face 28 and the annular wall 30 perform a coil-support function for the first inductive element 24. In this manner, the first inductive element 24 is contained along a direction substantially parallel to the rotation axis R between the face 28 and the annular wall 30.

On the annular wall 30 and on a lateral annular wall 31 of the second flange 29 one or more recesses and/or openings can be obtained for housing or the transit of electronic components of the unit of measurement 7.

The first inductive element 16 acts as a primary element of a transformer, as will be explained further on in the description.

The impact tool 1 comprises, further, an angular position sensor device, arranged for measuring an angular shift of the output shaft 3 around the rotation axis R thereof when the output shaft 3 is rotated. The rotation angle of the output shaft 3 around the rotation axis R thereof corresponds to the effective rotation angle of the external device rotated by the impact tool 1.

The angular position sensor device can comprise an encoder, in particular an incremental encoder.

Figure 13:
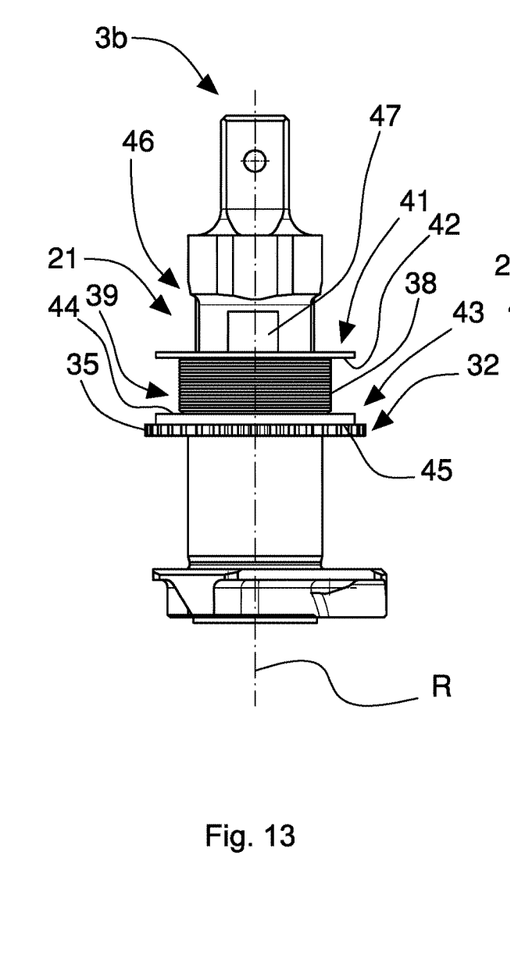
FIG. 13 is a view like that of FIG. 9 in which some components of the unit of measurement have been removed to highlight further components of the unit of measurement that are otherwise not visible.
Figure 14:
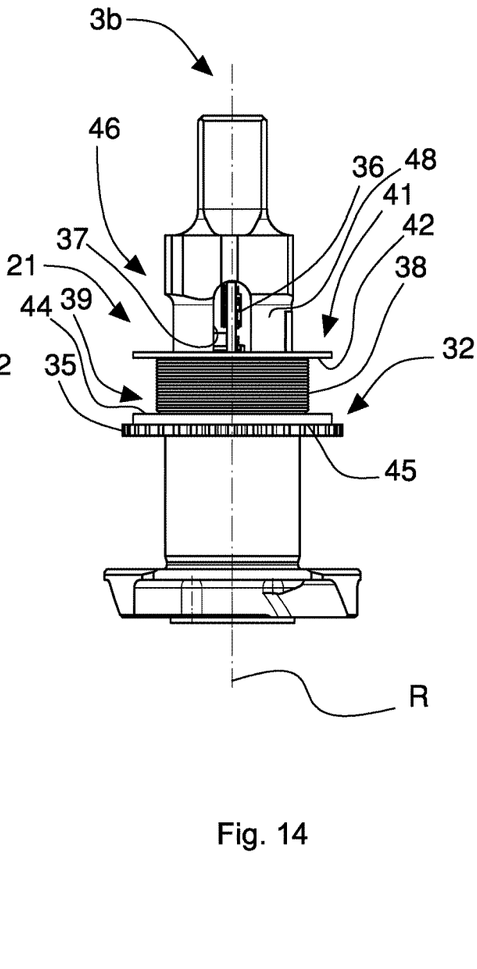
FIG. 14 is a frontal view of the further components of FIG. 13.
Figure 15:
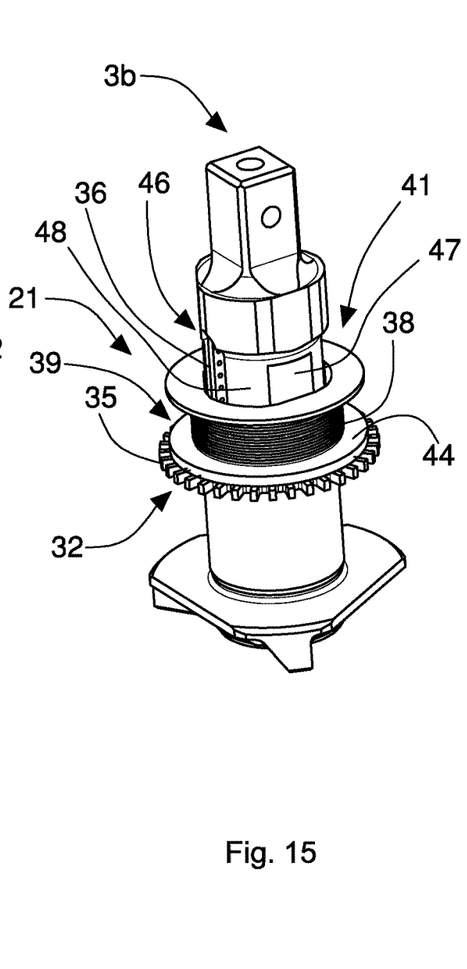
FIG. 15 is a perspective view of the further components of FIG. 13.
Figure 16:
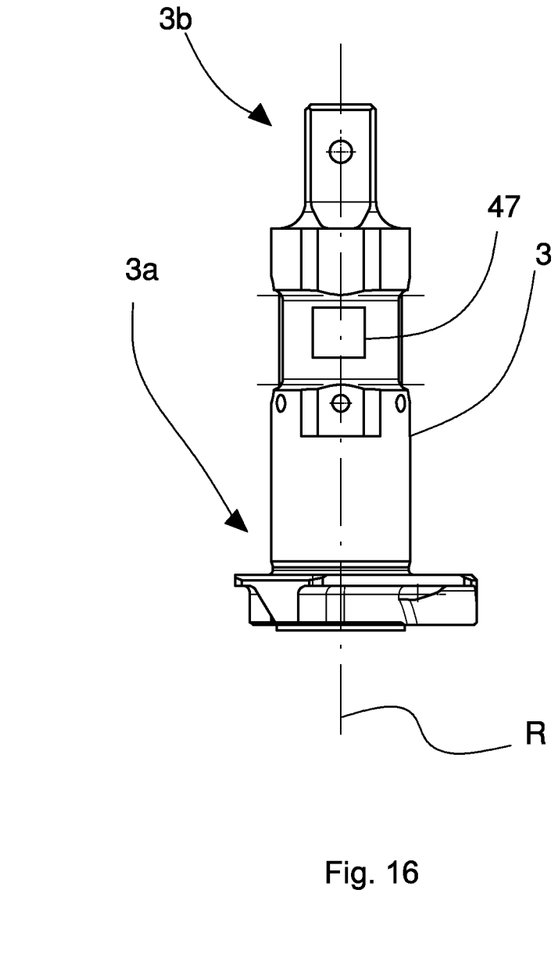
FIG. 16 is a view from the right of a portion of the output shaft of the impact tool of FIG. 1.
Figure 17:
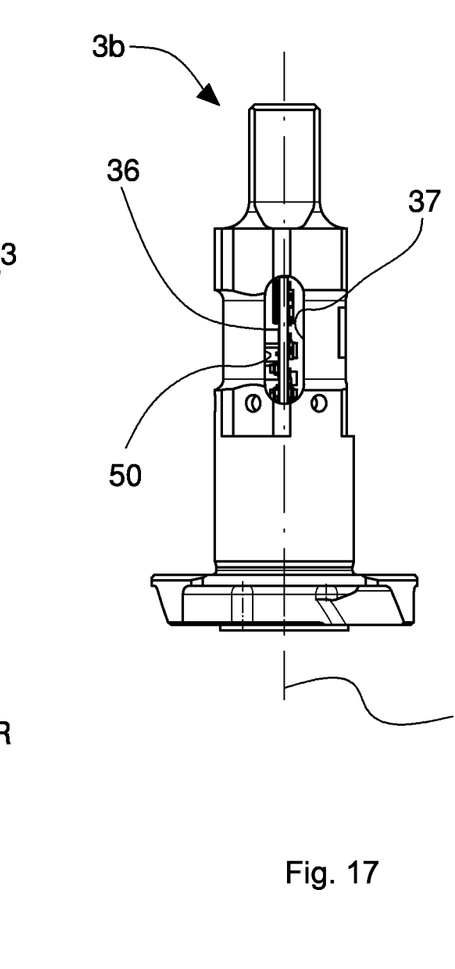
FIG. 17 is a frontal view of the portion of the output shaft of the impact tool of FIG. 1.
Figure 18:
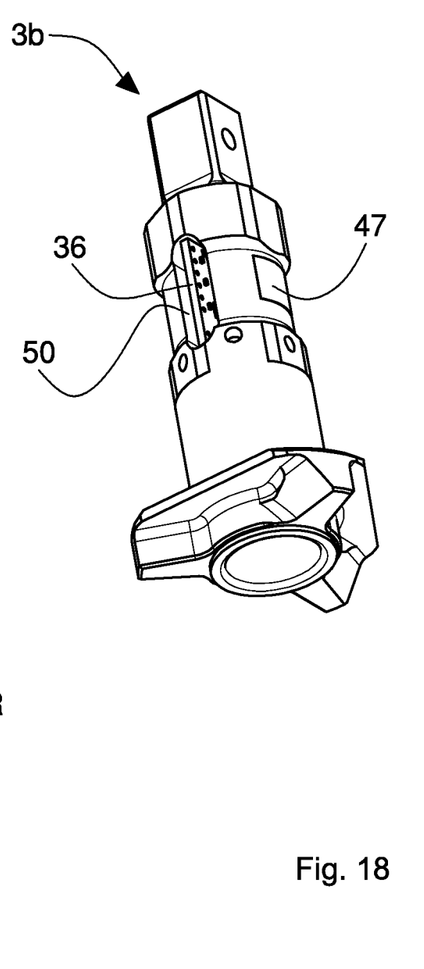
FIG. 18 is a perspective view of the portion of the output shaft of the impact tool of FIG. 1.

With reference in particular to FIGS. 13 to 15, the angular position sensor device can comprise a phonic wheel 32, with a substantially circular crown plan shape, mounted integrally to the output shaft 3. In particular, along an inner annular surface of the phonic wheel 32, openings can be obtained intended for housing fixing screws or grub screws that enable the phonic wheel 32 to be fixed to the output shaft 3.

The angular position sensor device comprises at least one Hall effect sensor 33 mounted so as not to rotate when the output shaft 3 is rotated. In other words, the Hall effect sensor 33 is fixed with respect to the output shaft 3.

The Hall effect sensor 33 is fixed, in particular, to the support element 25.

A magnet is associated with at least one Hall effect sensor.

In the lateral annular wall 31 of the second flange 29 an opening 34 is obtained to permit the transit of the pins of the Hall effect sensor 33 in order to permit an electric connection for the supply of the Hall effect sensor 33.

In the version shown in the drawings, a pair of Hall effect sensors 33 is provided to be able to identify the rotation direction travelled by the output shaft 3 and the corresponding shift. It is possible to provide in the lateral annular wall 31 an opening 34 for each Hall effect sensor 33, as in the illustrated embodiment. Alternatively, it is possible to provide a single opening for the transit of the pins of all the Hall effect sensors 33.

The phonic wheel 32 is so mounted that a notched edge 35 thereof faces the Hall effect sensor 33 or the pair of Hall effect sensors 33. The magnet associated with each Hall effect sensor 33 is mounted on the side of the respective Hall effect sensor 33 opposite the phonic wheel 32. In other words, each Hall effect sensor 33 is interposed between the respective magnet and the phonic wheel 32.

In this manner, in use, each Hall effect sensor 33 detects a magnetic field variation that is associated with the transit of a serration (or a perforation) of the notched edge 35 of the phonic wheel 32 opposite the Hall effect sensor 33. In other words, the Hall effect sensors 33 detect the alternation of serrations and perforations of the notched edge 35 in the form of the detected magnetic field variations. The serrations and the perforations are associated with angular rotation sectors of the output shaft 3 and the width thereof is an indication of the angular resolution of the angular position sensor device.

Owing to the phonic wheel 32 and to the Hall effect sensor 33, the angular position sensor device makes a magnetic encoder. When a pair of Hall effect sensors 33 is provided, the angular position sensor device makes an incremental magnetic encoder.

The angular position sensor device comprises an optoelectronic module, not shown in the Figures, arranged for receiving the magnetic field variations detected by the Hall effect sensor 33 or by the pair of Hall effect sensors 33 the pattern of which indicates the alternation of serrations and perforations of the notched edge 35, and for transforming the magnetic field variations into intensity variations of an electric parameter, for example electric current or potential difference.

Owing to the angular position sensor device, it is possible to discern the rotation direction of the output shaft 3 during use of the impact tool 1. It is further possible to measure the angular shift of the output shaft 3 over time and consequently possibly detect whether this angular shift varies in an undesirable manner, for example owing to incorrect tightening torque.

The fixed measuring assembly 20 is arranged, further, for enabling the analog output signal to be received from the optoelectronic module. For this purpose, the fixed electronic module 22 is connected to the optoelectronic module by, for example, a cable connection.

With particular reference to FIGS. 13 to 18, the rotating measuring assembly 21 comprises a rotating electronic module 36 arranged for conditioning the measuring signal indicating the torque to which the output shaft 3 is subjected in use.

The measuring signal is detected by a torque sensor, as will be explained further on in the description.

The rotating electronic module 36 is arranged in a housing 37 obtained in the output shaft 3. In particular, the housing 37 can have a through slot 50, i.e. traversing the output shaft 3 from side to side along a direction substantially perpendicular to the rotation axis R. The housing 37 can have a longitudinal extent that is substantially parallel to the rotation axis R.

In particular, the rotating electronic module 36 is fixed to the housing 37 by a connecting arrangement of known type. In this manner, the rotating electronic module 36 rotates integrally with the output shaft 3 when the latter is rotated.

The rotating electronic module 36 is provided with a rotating electronic board to which a microprocessor is mounted that is suitable for conditioning the measuring signal obtained from the torque sensor. In use, the microprocessor receives the input measuring signal, conditions the input measuring signal and supplies a conditioned output signal that carries the information relating to the torque measured by the torque sensor.

A low absorption microprocessor is chosen so that it consumes a minimal amount of energy.

The components of the rotating electronic module 36 are so selected as not to generate induced currents of piezoelectric type. This is particularly useful in applications in which the output shaft 3 rotates at high angular speeds, for example 10.000 RPM-13.000 RPM or more, and works as an impact hammer with very great and alternating mechanical stress.

The rotating measuring assembly 21 comprises a second inductive element 38, for example a coil, connected to the rotating electronic module 36 such that the latter can receive an electric supply transmitted to the second inductive element 38 by the first inductive element 24.

The second inductive element 38 is mounted in the rotating measuring assembly 21 so as to be coaxial with the first inductive element 24. In particular, the second inductive element 38 is placed inside the first inductive element 24 and is thus at a lesser distance from the rotation axis R with respect to the first inductive element 24.

The rotating measuring assembly 21 comprises, further, a support member 39 arranged for supporting the second inductive element 38.

The support member 39 is hollow to be able to receive internally a portion of the output shaft 3.

The support member 39 is mounted to rotate integrally with the output shaft 3.

The second inductive element 38 comprises a plurality of windings wound around the support member 39.

The support member 39 can comprise a hollow cylindrical portion around a surface of which the windings of the second inductive element 38 are wound in a loop. In the embodiment shown in the Figures, an outer surface of the hollow cylindrical portion is covered entirely by the windings of the second inductive element 38. In an alternative embodiment, the windings of the second inductive element 38 can cover partially this outer surface.

Also the support member 39, like the support element 25, can comprise, further, a pair of annular flanges for containing the windings of the second inductive element 38 along a direction substantially parallel to the rotation axis R.

The pair of annular flanges comprises a first annular flange 41 having a substantially disc shape with a plan shape like a circular crown and mounted near the end of the support member 39 nearer the distal end 3b of the output shaft 3. The first annular flange 41 comprises an annular face 42 facing the hollow cylindrical portion intended to contain longitudinally part of the windings of the second inductive element 38.

The pair of annular flanges comprises, further, a second annular flange 43 having a substantially disc shape with a plan shape like a circular crown and mounted near a further end of the support member 39 further from the distal end 3b of the output shaft 3. The second annular flange 43 comprises a side 44 facing the hollow cylindrical portion intended to contain longitudinally a further part of the windings of the second inductive element 38.

The hollow cylindrical portion, the annular face 42 and the side 44 perform a coil support function for the second inductive element 38. In this manner the second inductive element 38 is contained along a direction substantially parallel to the rotation axis R between the annular face 42 and the side 44.

The phonic wheel 32 can be mounted near a further side 45 of the second annular flange 43, opposite the side 44.

In one embodiment, the phonic wheel 32 can be fixed to the support member 39 of the second inductive element 38 alternatively to being fixed directly to the output shaft 3.

The second inductive element 38 acts as a secondary element of a transformer made by the first inductive element 24 and by the second inductive element 38.

In fact, in use, the first inductive element 24, supplied by the alternating supply signal, generates a variable magnetic induction flow that induces an electromotive force, or a variable voltage, in the second inductive element 38. In other words, the first inductive element 24 operates as a magnetic field generator and the second inductive element 38 operates as a magnetic field sensor.

Owing to the variable magnetic induction flow generated by the supply signal that flows in the windings of the first inductive element 24 and induces in the second inductive element 38 an induced electromotive force, an energy transfer is possible from the fixed measuring assembly 20 to the rotating measuring assembly 21, and vice versa.

In this manner, the rotating measuring assembly 21 and, in particular, the rotating electronic module 36, can receive an electric supply by magnetic coupling of the first inductive element 24 with the second inductive element 38.

The rotating measuring assembly 21 comprises, further, the torque sensor associated with the output shaft 3 and arranged for obtaining torque of the output shaft 3 during use, i.e. when the latter is rotated by the interface element-hammer combination.

The torque sensor is mounted to the output shaft 3 at a cylindrical end portion 46 of the distal end 3b of the output shaft 3 to measure the aforementioned torque of the output shaft 3. It has been found that the aforesaid end portion 46, which is interposed axially between the connecting element and the zone of the casing 2 from which the distal end 3b protrudes, is the shaft portion most suitable for positioning the torque sensor, in order to determine precisely the torsional moment that the impact tool 1 effectively applies to the mechanical adaptor 6 and thus to the screw member.

With reference in particular to FIGS. 13 to 18, the torque sensor comprises a strain gauge transducer 47, shown schematically with a rectangle in the Figures, fixed to a portion of outer surface 48 of the cylindrical end portion 46 of the output shaft 3 and arranged for measuring a deformation of the outer surface 48. In particular, the strain gauge transducer 47 can be glued to said outer surface 48.

The strain gauge transducer 47 can be for example of resistive type, i.e. can comprise one or more resistances. One or more of these resistances can be of variable type.

In use, the cylindrical end portion 46 of the output shaft 3 and, consequently, the strain gauge transducer 47 to which it is fixed, is subjected to deformation that is proportional to the torque force applied to the output shaft 3 during use. The strain gauge transducer 47 transduces the torsional deformation into a measuring signal, i.e. into a deformation signal, of analog type, which is proportional to the deformation applied to the outer surface of the shaft 3 to which it is fixed. When the strain gauge transducer 47 is of resistive type, the torsional deformation causes a variation in electrical resistance, which in turn causes a variation in the deformation signal.

The deformation signal can be for example a current or voltage value measurable for example by a bridge circuit with which the strain gauge transducer 47 is provided, for example a Wheatstone bridge. In particular, the strain gauge transducer 47 comprises a Wheatstone double half-bridge circuit. This enables improved conditioning of the deformation signal to be obtained, for example enables the deformation signal to be amplified.

By measuring the surface deformation to which the output shaft 3 is subjected by the strain gauge transducer 47, the torque sensor thus enables the torsional moment to be obtained to which the cylindrical end portion 46 of the output shaft 3 is subjected during operation.

The rotating electronic module 36 is connected to the strain gauge transducer 47 so as to receive and to be able to condition the deformation signal. Conditioning of the deformation signal comprises, for example, amplifying in succession the deformation signal by an amplifier, filtering the output deformation signal from the amplifier by a filtering device and converting digitally the deformation signal outputted by the filtering device. In order to perform this conditioning, the rotating electronic module 36 is provided with suitable electronic components of known type. A conditioned signal will thus exit the rotating electronic module 36 that is transmitted to the fixed electronic module 22 by magnetic coupling between the first inductive element 24 and the second inductive element 38.

The impact tool 1 can comprise, further, a pressure sensor, not shown in the Figures, arranged for detecting pressure during operation. The values detected by the pressure sensor can be used to establish a start of acquisition of the measuring signal. For example, acquisition of the measuring signal can start when the pressure sensor detects a drop in pressure indicating a first actuation of the start button 13.

In use, the fixed electronic module 22 processes both the conditioned signal and the analog signal from the optoelectronic module to enable the signals to be transmitted to a control unit, for example a remote control unit.

The control unit can be connected via cable to the fixed electronic module 22.

Alternatively, the control unit and the impact tool 1 can communicate by a data transmission network of CAN-BUS type.

The control unit is configured to acquire the conditioned signal indicating the torsional moment on the output shaft 3 during operation, and thus determine the torque to which the output shaft 3 is subjected during tightening and loosening of a bolt.

The control unit is further configured to acquire the analog output signal from the angular position sensor device, and thus determine an operating mode of the impact tool 1. For example, when the impact tool 1 is a wrench, the control unit is able to detect whether the latter is actuated and, in particular, for screwing or for unscrewing.

Further, the degrees of rotation of the output shaft 3 are sent to the control unit in order to associate with each torque value a degree of rotation of the output shaft 3 to determine incorrect tightening.

The control unit comprises a signal processing device that analyzes the signals received from the control unit and can determine whether a desired situation, i.e. completed tightening of a bolt has been reached. The desired situation can be reached, for example, when the torque becomes greater than or the same as a maximum preset and programmable torque threshold value.

Naturally, the threshold value can be comprised within a threshold values tolerance range.

The signal processing device can connect the conditioned torque signal with the analog output signal from the angular position sensor device, with reference to the same interval of time, to determine reaching of the desired situation, i.e. of completed tightening or loosening of the bolt. The desired situation can be reached if the torque that is greater than or the same as the aforesaid preset threshold value is matched by a preset angular shift over time of the output shaft 3.

The signal processing device can obtain monitoring data associated with the processed signals. The aforesaid monitoring data can then be displayed on a display device, for example a monitor.

The monitoring data can comprise torque setting values of each nut, in order to establish whether a tightening is considered suitable or not.

The control unit can also acquire a maximum rotation speed of the output shaft 3 of the impact tool 1 during tightening of each nut.

The signal processing device can be programmed for acquiring the signal indicating torque and the signal indicating angular position only in a given acquisition interval of time. In particular, the control unit can be programmed to receive a minimum torque threshold value (for example a value that is set by the operator and is programmable) and for acquiring the signal indicating torque in an interval of time that has as a lower end the moment in which the aforesaid minimum torque threshold value is reached.

The upper end can be a value that is set by the operator or is programmable. For example, the acquisition interval can be 15 seconds. The interval between the aforesaid lower end and upper end defines the duration of the acquisition interval of time.

The signal processing device is accordingly programmed to limit torque data acquisition time. The torque values that, within the hammer-anvil impact cycle, whilst exceeding the minimum torque threshold value, are detected after the interval of time defined by the maximum value, will not be considered by the processing device.

The signal processing device can be programmed to establish the aforesaid lower end when it is simultaneously detected that the minimum torque value has been exceeded and another condition has occurred. The other condition can be, for example, that a photocell or camera has detected the transit of the vehicle onto or from which one or more wheels are to be screwed/unscrewed.

The magnetic coupling between the first inductive element 24 and the second inductive element 38 is in particular a resonant magnetic coupling. In fact, in this manner maximum power is transferred.

In order to obtain resonant magnetic coupling between the first inductive element 24 and the second inductive element 38, the fixed measuring assembly 20 comprises, further, a first capacitor, not shown in the Figures, serially connected to the first inductive element 24 and the rotating measuring assembly 21 comprises, further, a second capacitor, not shown in the Figures, connected to the second inductive element 38 serially or in parallel. The capacity values of the first capacitor and of the second capacitor are so selected that the resonance of the equivalent LC circuit seen from the first (primary) inductive element 24 coincides with the frequency of the supply signal with which the first inductive element 24 is supplied, for example the square wave. In this manner, the current that is generated in the first inductive element 24 and in the second inductive element 38 is sinusoidal and the energy transfer is maximized even when the first inductive element 24 and the second inductive element 38 are not perfectly coupled.

The fixed measuring assembly 20 can comprise, further, an H bridge connected on one side to the first inductive element 24 and on the other to the fixed electronic module 22, so that it is traversed by the supply signal.

In use, it is possible to use an excitation frequency that is higher than the resonance of the LC circuit. This is done for reasons of stability of the electric circuits inasmuch as electronic components may be subject to small value changes, for example through temperature variations.

The rotating measuring assembly 21 can comprise, further, a rectifier, for example a rectifier bridge for high frequency, connected to the second inductive element 38 to transform the alternating current supply signal into a direct current signal. The output supply signal from the rectifier will have, as is known, only positive half-waves with double frequency with respect to the supply signal generated by the fixed electronic module 22.

The rotating measuring assembly 21 can comprise, further, an electrolytic capacitor arranged downstream of the rectifier.

Owing to the rectifier and to the electrolytic capacitor, the electric components of the rotating electronic module 36 and the torque sensor can be supplied correctly and it is accordingly possible to obtain the measuring signal and the conditioned signal from the measuring signal, indicating the torsional moment to which the cylindrical end portion 46 is subjected.

An embodiment will be explained below of a method for acquiring and distributing the measuring signal implemented by the unit of measurement 7, which method for acquiring and distributing enables the measuring signal detected by the rotating electronic module 36 to be transmitted to the fixed electronic module 22 and accordingly to the control unit, so as to be able to obtain the information on the torque applied to the output shaft 3 that the measuring signal carries with itself.

The measuring signal cannot be sent as such from the torque sensor to the fixed electronic assembly 20 because of the noise that is naturally present in the measuring chain of the impact tool 1, i.e. in the "path" between electronic devices along which the measuring signal has to travel to reach the fixed electronic module 22 and the control unit.

The method for acquiring and distributing comprises providing a first inductive element 24 and a second inductive element 38 that are coupled magnetically to permit an electric supply of the rotating measuring assembly 21 and transmission of the measuring signal from the rotating measuring assembly 21 to the fixed measuring assembly 20.

In particular, the magnetic coupling between the first inductive element 24 and the second inductive element 38 can be resonant.

The method for acquiring and distributing comprises, further, supplying the first inductive element with an alternating supply signal and supplying the torque sensor with the supply signal transferred from the first inductive element 24 to the second inductive element 38 by the aforesaid magnetic coupling.

The method for acquiring and distributing comprises, further, providing a first capacitor connected to the first inductive element and a second capacitor connected to the second inductive element and selecting the capacity values of the first capacitor and of the second capacitor so that the resonance of the equivalent LC circuit seen from the first inductive element coincides with the frequency of the supply signal that supplies the first inductive element in order to generate the resonant magnetic coupling.

The method for acquiring and distributing comprises, further, detecting a measuring signal by a torque sensor, in particular by the strain gauge transducer 47.

The method for acquiring and distributing comprises, further, acquiring said measuring signal from the rotating electronic module 36 and conditioning the measuring signal by the rotating electronic module 36.

The acquisition of the measuring signal can start when the pressure sensor detects a drop in pressure indicating a first actuation of the start button 13.

The conditioning step for conditioning the measuring signal can comprise amplifying the measuring signal by an amplifier.

The conditioning step can comprise, further, filtering the amplified measuring signal by a filtering device.

The method for acquiring and distributing comprises, further, converting the conditioned measuring signal from an analog signal to a digital signal by an analog/digital converter.

The method for acquiring and distributing comprises, further, modulating the measuring signal, in particular the measuring signal conditioned and converted into a digital signal. For example, modulation can be pulse width modulation (PWM). The carrier wave can be a square wave with a constant period. The modulating wave is the measuring signal.

PWM is extremely reliable because the frequency is constant and, accordingly, the filtering device is not influenced.

The method for acquiring and distributing involves extracting the information on the tightening torque by increasing, in a preset zone of the unit of measurement 7, energy consumption indicating the tightening torque according to a preset logic.

In fact, owing to the conformation of the unit of measurement 7, i.e. of the coupling between the first inductive element 24 and the second inductive element 38, current, or voltage consumption, in the second inductive element 38 is reflected in current consumption in the first inductive element 24. Accordingly, by modifying, in particular increasing, current, or voltage consumption, in the second inductive element 38 according to a preset digital, or analog code, it is possible to detect a corresponding consumption variation in the first inductive element 24, from which it is possible to extract the information relating to the tightening torque.

The method for acquiring and distributing thus comprises providing a transistor associated with the second inductive element 38 in a current generator configuration, for example a BJT, in particular of the npn type, configured so that when it is switched on, i.e. conducts (or is in the active region if it is a BJT, or also is in ON mode), consumes energy that is proportional to a programmed signal, in particular a current signal. In other words, the transistor is mounted so as to remain switched on for a time that is proportional to the deformation undergone by the output shaft 3, i.e. the transistor varies the ON time within a period of time proportionally to the torsional moment to which the output shaft 3 is subjected during operation of the impact tool 1. The information on the tightening torque is encoded in the form of duration of ON time within each period of time. The period of time is the period of the measuring signal.

When the transistor is a BJT it comprises a base, a collector connected to a supply voltage by a collector resistance and an emitter connected to ground.

The method for acquiring and distributing comprises, further, sending to an input, or terminal, of the transistor, in particular to the base, the measuring signal, possibly conditioned and converted into a digital signal.

In use, the transistor is switched ON for a time that is proportional to the measured parameter. In particular, it is considered a wave interval of the measuring signal that goes from 10% to 90% of the period. In this manner, considering signals that switch on the transistor but are due to noise of the unit of measurement 7 is avoided.

The method for acquiring and distributing comprises, further, transferring by magnetic coupling the modulated signal from the second inductive element 38 to the first inductive element 24.

The method for acquiring and distributing comprises, further, providing a resistance, in particular a shunt, connected to the base of an H bridge that is in turn connected to the first inductive element 24 to measure a current that traverses the first inductive element 24 and is proportional to the current that flows in the resistance to which a terminal of the transistor is connected.

It is thus possible to establish whether in the transistor associated with the second inductive element 38 current is circulating or not.

In this manner, it is possible to extract information on the tightening torque measured on the output shaft 3, because the current that flows in the resistance to which the transistor is connected is a function of the modulated signal and thus, of the tightening torque.

The method for acquiring and distributing comprises, further, sampling the measuring signal to measure the amplitude of the sinusoids of which it consists.

Sampling can be synchronous sampling, in which sampling occurs in the centre of the sinusoid (i.e. at a peak amplitude value), and if the amplitude is greater than a preset threshold value a counter is increased, otherwise this amplitude is not considered.

The method for acquiring and distributing the measuring signal can comprise calibrating the unit of measurement 7 with test measuring signals. In particular, calibration occurs by detecting the measuring signal for example in a condition of non-use of the impact tool 1 (i.e. when the start button 13 is not pressed) and in a condition of use of the impact tool 1 (for example when the start button 13 is fully depressed).

The threshold value is chosen as the half-sum between the maximum amplitude and the minimum amplitude of the measuring signal during calibration.

In other words, it is sufficient to count the high half-waves, i.e. how many times the amplitude of the measuring signal exceeds a preset threshold value in a period to obtain the duty cycle percentage in which the transistor is switched ON and thus the tightening torque value.

In particular, as the current, which is a sinusoid current, is rectified as a double half-wave in the second inductive element 38 by the rectifier, in the shunt on the first inductive element 24 a series of half-waves will be seen with a frequency twice that of the excitation frequency and when the transistor is switched on the amplitude of the half-waves is raised by a level.

The acquisition system associated with the impact tool 1 according to the invention for acquiring the measuring signal in order to permit a reading thereof, is not substantially altered by the operating conditions of the impact tool 1 that require high and complex dynamic stress.

Also, the unit of measurement 7 is tough and has a long working life owing to the fact that the two inductive elements 24 and 38 and the acquisition system are substantially protected from oxidation by atmospheric agents. In fact, for example, the rotating electronic module is inserted inside the housing 37 and protected therein.

The impact tool 1 disclosed above is a wrench, usable in particular for changing the wheels of a vehicle (for example in car races or in garages), or in the building industry, or in other industrial sectors. It is possible to apply the teachings disclosed above to any other type of impact tool with rotating hammer-anvil.

The invention claimed is:

1. Impact tool comprising:
   a casing;
   a rotating hammer arranged in said casing and rotatable by a motor;
   a rotating interface element arranged in said casing and rotatable by said hammer by a series of impacts;
   an output shaft rotating around a rotation axis, said output shaft having a proximal end fixed to said interface element and a distal end protruding from said casing, said distal end ending with a connecting element for removable connection to an outer mechanical adaptor;
   a unit of measurement arranged for obtaining a torque of said output shaft by a torque sensor mounted to said output shaft, said unit of measurement comprising a fixed measuring assembly mounted integrally to said casing and a rotating measuring assembly mounted so as to rotate integrally with said rotating output shaft;
   said fixed measuring assembly being configured to generate a supply signal and transmit said supply signal to said rotating measuring assembly to supply electrically said rotating measuring assembly;
   said rotating measuring assembly being configured to detect a measuring signal indicating said torque and condition said measuring signal in order to be able to send the measuring signal to said fixed measuring assembly;
   said fixed measuring assembly and said rotating measuring assembly comprising electronic devices that carry out a two-directional communication in contactless mode by magnetic coupling between said fixed measuring assembly and said rotating measuring assembly, said communication being configured to supply magnetically said torque sensor and permit transmission of said measuring signal conditioned by said rotating measuring assembly to said fixed measuring assembly;
   said fixed measuring assembly comprising a fixed electronic module provided with a microprocessor suitable for generating said supply signal, said fixed measuring assembly further comprising a first inductive element connected with said fixed electronic module to receive said supply signal and act as a generator of a magnetic field;
   said rotating measuring assembly comprising a rotating electronic module provided with a microprocessor that is suitable for processing said measuring signal, said rotating measuring assembly further comprising a second inductive element connected with said rotating electronic module and mounted coaxially inside said first inductive element to act as a sensor of said first magnetic field;
   wherein said rotating electronic module is arranged in a housing obtained in said output shaft to rotate integrally with said output shaft when said output shaft is rotated.

2. Impact tool according to claim 1, wherein said magnetic coupling is resonant.

3. Impact tool according to claim 1, wherein said supply signal is a square wave.

4. Impact tool according to claim 1, wherein said fixed electronic module is arranged in a seat obtained in said casing.

5. Impact tool according to claim 1, wherein said housing has a through slot shape traversing said output shaft from side to side along a direction substantially perpendicular to said rotation axis.

6. Impact tool according to claim 1, wherein said fixed measuring assembly further comprises a first capacitor connected to said first inductive element and said rotating measuring assembly further comprises a second capacitor connected to said second inductive element.

7. Impact tool according to claim 6, wherein the capacity values of said first capacitor and of said second capacitor are so selected that the resonance of the equivalent LC circuit seen from said first inductive element coincides with the frequency of said supply signal of said first inductive element in order to generate said resonant magnetic coupling.

8. Impact tool according to claim 6, wherein the capacity values of said first capacitor and of said second capacitor are so selected that the resonance of the equivalent LC circuit seen from said first inductive element is less than the frequency of said supply signal of said first inductive element.

9. Impact tool according to claim 1, wherein said rotating measuring assembly further comprises a rectifier connected to said second inductive element to transform said supply signal from an alternating current signal into a direct current signal.

10. Impact tool according to claim 9, wherein said rectifier is a rectifier bridge for high frequency.

11. Impact tool according to claim 9, wherein said rotating measuring assembly further comprises an electrolytic capacitor arranged downstream of said rectifier.

12. Impact tool according to claim 1, wherein said torque sensor is mounted in said rotating measuring assembly and is provided with at least one strain gauge transducer fixed to an outer surface of a cylindrical portion of said distal end adjacent to said connecting element to detect said measuring signal, said measuring signal being a deformation signal that is proportional to a deformation of said outer surface when said shaft is rotated and is indicative of said torque, said strain gauge transducer being connected to said rotating electronic module so said rotating electronic module can receive said deformation signal.

13. Impact tool according to claim 1, and further comprising an angular position sensor device arranged for detecting an angular shift of said output shaft rotating around said rotation axis.

14. Impact tool according to claim 13, wherein said angular position sensor device comprises a phonic wheel mounted integrally with said rotating output shaft and at least one Hall effect sensor mounted fixed with respect to said rotating output shaft, said phonic wheel and said at least one Hall effect sensor being mounted reciprocally so that a notched edge of said phonic wheel faces said at least one Hall effect sensor so that said at least one Hall effect sensor detects magnetic field variations due to an alternation of notches and of perforations of said notched edge.

15. Impact tool according to claim 14, wherein said angular position sensor device comprises an optoelectronic module arranged for transforming said magnetic field variations into variations of an electric parameter and outputting an analog signal indicating said magnetic field variations.

16. Impact tool according to claim 15, wherein said fixed electronic module is connected to said optoelectronic module, said fixed electronic module being arranged for receiving said conditioned measuring signal and said analog signal indicating said magnetic field variations and processing said conditioned measuring signal and said analog signal to enable the measuring signal and analog signal to be sent to a control unit.

\* \* \* \* \*